United States Patent
Fujihara et al.

(10) Patent No.: US 6,246,802 B1
(45) Date of Patent: Jun. 12, 2001

(54) IMAGE DATA PROCESSOR

(75) Inventors: Shiro Fujihara; Yasuhiko Okuhara; Hirotaka Nakano; Fumihiro Okazaki, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/961,889

(22) Filed: Oct. 31, 1997

(30) Foreign Application Priority Data

| Sep. 30, 1996 | (JP) | 8-259771 |
|---|---|---|
| Sep. 30, 1996 | (JP) | 8-259772 |
| Mar. 5, 1997 | (JP) | 9-050195 |

(51) Int. Cl.[7] ................................ G06K 9/00

(52) U.S. Cl. ................................ 382/276

(58) Field of Search ................ 382/232, 248, 382/250, 276–281; 380/4, 28, 34

(56) References Cited

U.S. PATENT DOCUMENTS

| 4,807,029 | * | 2/1989 | Tanaka | 348/400 |
|---|---|---|---|---|
| 5,014,198 | * | 5/1991 | Umemura | 382/232 |
| 5,046,121 | * | 9/1991 | Yonekawa et al. | 382/250 |
| 5,548,336 | * | 8/1996 | Ueda | 348/384 |
| 5,625,714 | * | 4/1997 | Fukuda | 382/233 |
| 5,657,399 | * | 8/1997 | Iwabuchi et al. | 382/248 |
| 5,848,155 | * | 12/1998 | Cox | 380/4 |

FOREIGN PATENT DOCUMENTS

| 0 766 468 | 4/1997 | (EP) . |
|---|---|---|
| 0 851 679 | 7/1998 | (EP) . |
| 6-121313 | 4/1994 | (JP) . |

OTHER PUBLICATIONS

"A Secure Robust Watermark for Multimedia". Igemar J. Cox, Joe Kiliant, Tom Leighton and Tala J. Shamoon, Workshop on Information Hiding, Newton Institute, Univ. of Cambridge, May 1996.

"A Structural Method for Document Image Data Having a Copy Prevention Function", Technical Report of IEICE IT93–65, ISEC93–67, SST93–60 (1993–12), pp. 13–18.

"NEC Data Hiding Proposal", Response to Call for Proposal Issued by the Data Hiding SubGroup Copy Protection Technical Working Group, Version 1.0, Jul. 1, 1997.

"A WWW Service to Embeded And Prove Digital Copyright Watermarks," Jian Zaho [sic], Prof. Of the European Converence on Multimedia Applications, Services and Technologies, Louvain–La–Neuve Belgium, May 1996.

Cox I J et al: "A Secure, Imperceptible Yet Perceptually Salient, Spread Spectrum Watermark for Multimedia–"SOUTHCON, US, New York, IEEE, 1996, pp. 192–197, XP000613940 ISBN: 0–7803–83269–5.

\* cited by examiner

*Primary Examiner*—Jose L. Couso
*Assistant Examiner*—Gregory Desiré
(74) *Attorney, Agent, or Firm*—Sughrue, Mion, Zinn, Macpeak & Seas, PLLC

(57) ABSTRACT

An encoder, which comprises a means 40 for embedding a specific electronic mark data in a characteristic part of an image converted to a spatial frequency area, a quantizing means 50 for quantizing the spatial frequency area data in which the electronic mark data is embedded and a variable length encoder 60 for variable length coding the quantizer output, outputs compression coded digital image data. A decoder comprises a variable length decoder 80 and reverse quantizer 90 for restoring compression encoded digital image data to spatial frequency area data, means 120 for detecting the electronic mark data from the restored data, and detection display means 130 for displaying the detection result.

8 Claims, 9 Drawing Sheets

IMAGE DATA PROCESSOR

BACKGROUND OF THE INVENTION

This invention relates to a device for processing digital image data, in particular a device for encoding and decoding image data.

In recent years, devices have been developed for compressing image data based on standards such as JPEG, MPEG-1, MPEG-2, H261, H263, and reproducing the image data. Image encoding devices based on these standards offer a high data compression ratio while maintaining high image quality, and are therefore expected to become more widespread.

As this compressed data is digital data, there is almost no deterioration of quality even if the data is repeatedly duplicated, or copied. It is therefore possible, instead of expending the effort required to produce original data, to illegally duplicate data which is already commercially available and release any part of it onto the market as if it was original data. To counter this trend, producers of the original data are for example scrambling their data in order to prevent unauthorized duplication or partial misappropriation.

FIG. 8 is a block diagram showing an example of a conventional encoder/decoder of digital image data comprising an illegal duplication protection mechanism. In an encoder 201, an original image is passed through a Discrete Cosine Transformation (DCT) unit 20, quantizer (Q) 50 and variable word length coder (VWL) 60 to be converted into the compressed digital image data based on MPEG, for example, and is then scrambled in a scrambler 210. The scrambled digital image data can be reproduced only by a descrambler corresponding to the scrambler. The scrambled data is transmitted to a recording/transmission means 70.

The digital data inputted to a decoder 202 is therefore scrambled. In the descrambler 220, the scrambled data is descrambled, and the original compressed digital image data based on MPEG, etc., is re-constructed. The re-constructed data passes through a variable word length decoder 80, reverse quantizer 90 and inverse discrete consine transformation (IDCT) unit 100 so as to give a reproduced image. In this way, in the prior art, illegal duplication was prevented by scrambling data. JP-A-6-121313 (1994) discloses an example where a scrambling technique is applied to an analog picture signal.

Hence, it was previously possible to prevent illegal duplication by scrambling, but due to technical advances, protection of illegal duplication by this method has become ineffective. Specifically, a person who intends to illegally duplicate data analyzes the scrambling algorithm, and is then able to descramble the scrambled data. As a result, a cycle has been created where producers of original data continually develop new scrambling algorithms, and illegal duplicators continually analyze the new algorithms to descramble the scrambled data. Consequently, it has become fundamentally impossible to eradicate illegal duplication. After a scrambling algorithm is analyzed and the data has been descrambled, it may then be duplicated in the usual way. It is also extremely easy to duplicate data which has been duplicated once. Therefore, conventional techniques could not prevent the increasing spread of illegal duplication.

SUMMARY OF THE INVENTION

It is therefore an object of this invention to provide an image data processor which can distinguish illegally duplicated data.

One aspect of this invention therefore provides an encoder for producing compressed, digital image data, this encoder comprising a DCT unit for subjecting DCT to an original image, electronic water mark embedding means for embedding an electronic water mark containing predetermined specific information in the data transformed by the DCT unit, a quantizer for quantizing data output by the electronic water mark embedding means, and a variable length encoder for performing variable length coding on the data quantized by the quantizer. The electronic water mark will be also called "electronic mark" hereinafter in the specification.

It is a further object of this invention to provide a decoder for decoding the compressed, digital image data, variable length decoder for performing variable length decoding on the variable length coded image data, an inverse quantizer for performing inverse quantization on the variable length decoded data, means for detecting an electronic mark in the inverse quantized data, means for notifying the result detected by the detecting means to an operator, or controlling the state of a device according to this result, means for performing an inverse discrete consine transformation on the inverse quantized data, and means for obtaining a reproduced image.

In the encoder, electronic mark data is embedded by electronic water mark embedding means in a characteristic part of the image represented by a spatial frequency area. In practice, the human eye cannot perceive the embedded electronic mark data, so the information can be incorporated in the image without affecting image quality.

Also, as the embedded electronic mark data cannot be deleted or modified, it is not eliminated by duplication. Hence, by first embedding electronic mark data having a specific meaning in the image data when it is produced, and detecting this mark in the decoding process, it may be used to verify the owner's rights to illegally duplicated data and to suppress unauthorized duplication by controlling the playback device.

One example of this is when the embedded electronic mark in the image data has the significance of prohibiting duplication. When the decoder on the playback side detects that such a mark has been embedded in the data, a warning may be given to the user in the form of sound or characters informing him that duplication is prohibited, and appealing to his moral sense to avoid illegal duplication.

Another example is when the electronic mark bears the electronic signature of the data's copyright owner. If data is found which is though to have been illegally copied, the decoder shows that the electronic mark is embedded in the image data. The user is then requested to stop using the data, or the mark may be used as evidence in a legal action to claim damages for the unauthorized use of the data.

DETAILED DESCRIPTION OF THE PREFERRED EMBODIMENTS

Figure 9:
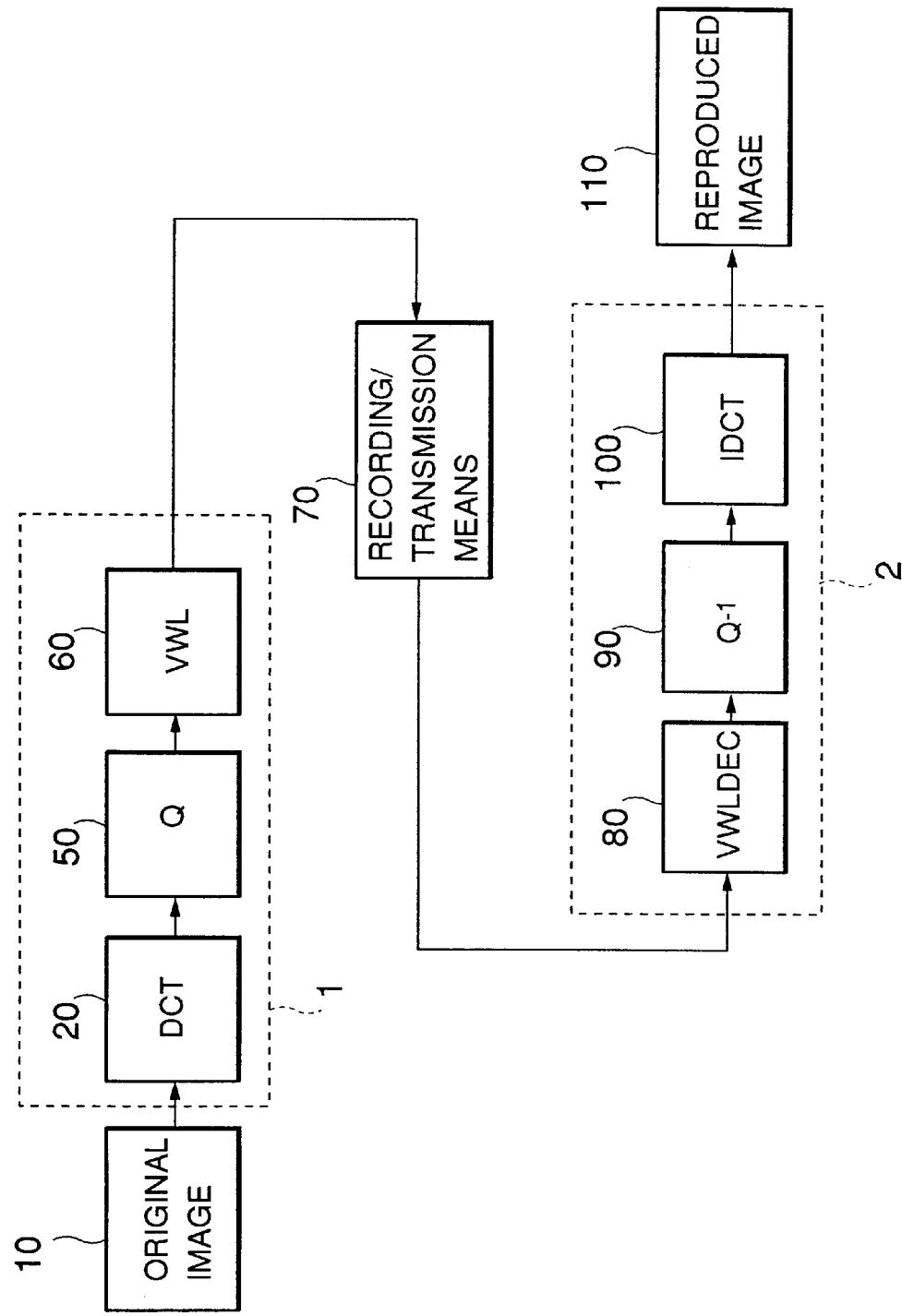
FIG. 9 is a block diagram showing the construction of an ordinary encoder 1 and decoder 2 according to the prior art.

In order to better comprehend this invention, a simple description will first be given of an encoder/decoder based on JPEG, MPEG-1, MPEG-2, H261 and H263. These standards differ in fine details, however there is no real difference in that their basic image compression algorithms perform discrete cosine transformation (DCT), quantization and variable word length coding (Hufmann coding, for example), and in that motion compensation is performed on moving images. FIG. 9 is a block diagram showing, in schematic form, the construction of an ordinary encoder/decoder based on JPEG, MPEG-1, MPEG-2, H261 or H263. Header processing and zigzag scanning are required for all standards except JPEG, however, apart from the fact that they are shown in the diagrams, their description has been omitted because they are unrelated to true nature of this invention.

In FIG. 9, this general encoder 1 consists of a DCT unit 20, quantizer 50 and variable word length coder (VWL) 60.

An original image 10 is input to the DCT device 20, and two-dimensional DCT is subjected to rectangular area units (blocks) of 8 pixels×8 pixels size so as to transform data expressed in a time area to data expressed in a spatial frequency area.

In general, when data is expressed in a spatial frequency area, data compression is easy because data in a spatial frequency area tends to be concentrated in the low spatial frequency region.

The data outputted from the DCT device 20 is inputted to the quantizer (Q) 50, where it is quantized. This processing reduces the a number of values to which the quantized data may become. Data outputted from the quantizer 50 is inputted to the variable length encoder 60, and is variable-word-length coded. In variable length coding, the amount of data is compressed by assigning shorter code lengths to lower appearance frequencies in the data, so Huffman codes are used in case of MPEG.

The data outputted from the variable word length encoder 60 is stored or transmitted by a recording/transmission means 70. Specifically, it is recorded on a recording medium such as an optical disk, magnetic disk or magneto-optic disk, and then sold or distributed. It may also be transmitted or broadcast by a wireless or wire, e.g. by ground wave/satellite/cable.

FIG. 9 also shows a general decoder 2 comprising a variable word length decoder (VWLDEC) 80, inverse quantizer ($Q^{-1}$) 90 and inverse discrete cosine transformation (IDCT) unit 100.

The data which has been generated in the encoder 1 and passed through the recording/transmission means 70, is inputted to a variable length decoder 80. The variable word length decoder 80 decodes fixed length codes representing values assigned to variable length codes, and outputs them in order to facilitate subsequent processing. Data outputted by the variable word length decoder 80 is inputted to the inverse quantizer 90 where it is inverse-quantized. In other words, it is re-constructed to values having the same magnitude as prior to quantization on the encoder 1 side. The output of the inverse quantizer 90 is inputted to the inverse discrete cosine transformation unit 100, and two-dimensional inverse discrete cosine transformation is subjected to spatial frequency data of each 8 pixels×8 pixels block. In this way, data expressed in a spatial frequency area is transformed into data in a time. A reproduced image 110 substantially the same as the original image 10 is thereby obtained. However, as part of the information is lost in the process of quantization/inverse quantization, it is not completely identical to the original image 10.

Next, a first embodiment of this invention will be described referring to the drawings.

Figure 1:
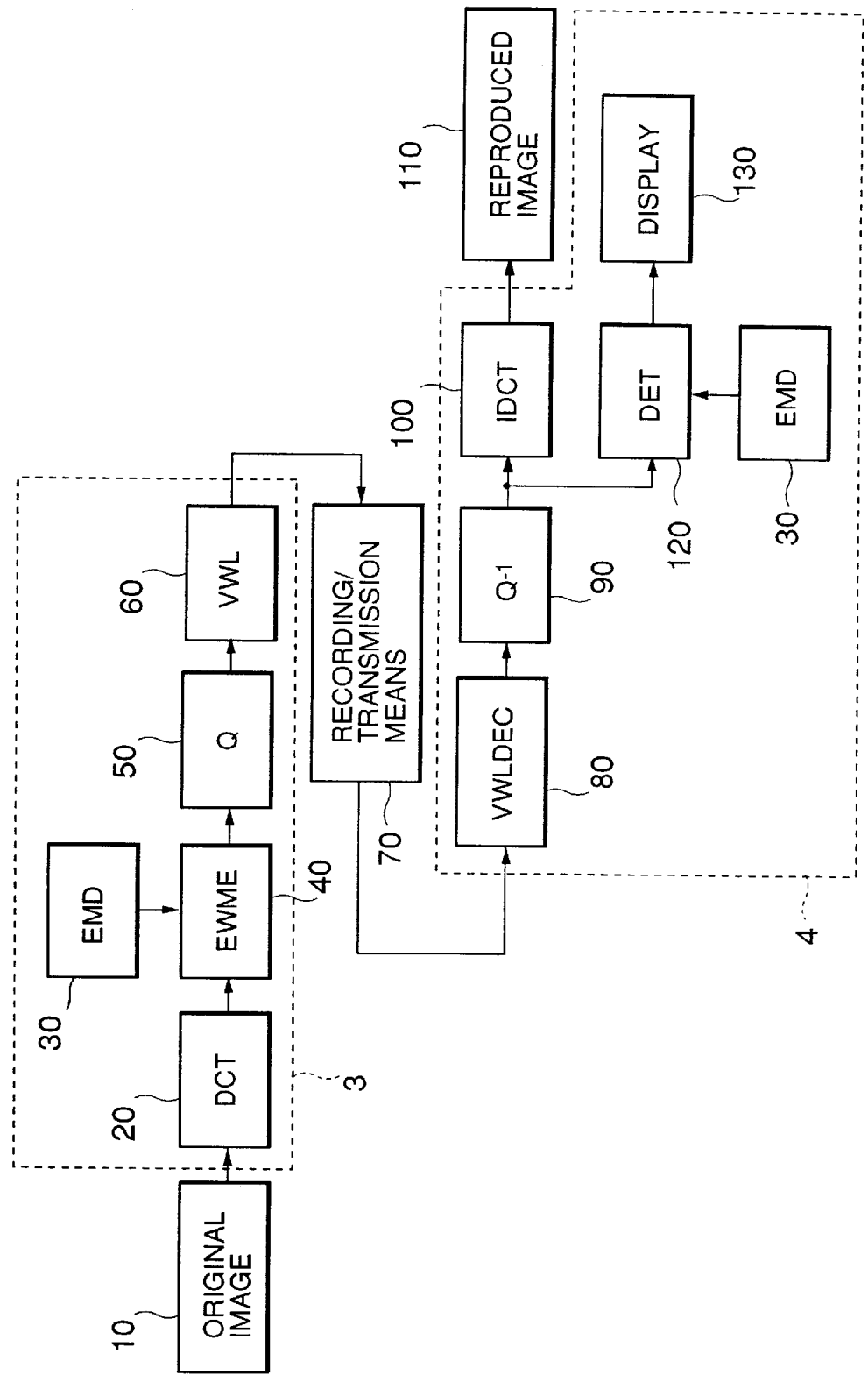
FIG. 1 is a block diagram showing a first embodiment of this invention.

FIG. 1 is a block diagram showing the first embodiment of this invention. In FIG. 1, an encoder 3 according to this invention comprises a DCT unit 20, electronic water mark embedding means (EWME) 40, quantizer (Q) 50 and variable word length coder (VWL) 60. A decoder 4 according to this invention comprises a variable word length decoder (VWLDEC) 80, an inverse quantizer ($Q^{-1}$) 90, an inverse discrete cosine transformation unit (IDCT) 100, electronic water mark detection means (DET) 120 and a display 130.

As in the case of ordinary JPEG or MPEG encoders/decoders mentioned hereabove, header processing, zigzag scan processing and motion compensation are unrelated to the salient features of this invention and their description is therefore omitted, but they are the same as for ordinary encoders/decoders.

In FIG. 1, the original image 10 is inputted to the DCT unit 20 on the encoder 3 side, and two-dimensional DCT is subjected to blocks of 8 pixels×8 pixels size so as to transform data expressed in a time area to data expressed in a spatial frequency area.

The data outputted from the DCT unit 20 is inputted to the electronic water mark embedding means (EWME) 40 where a specific electronic mark data 30 is embedded in it. The data outputted from the electronic water mark embedding means 40 is inputted to the quantizer 50 where it is quantized. The data output from the quantizer 50 is inputted to the variable word length encoder 60 where it is coded from a fixed length code to a variable length code, and it is outputted from the variable length encoder as compressed digital image data based on, e.g., MPEG.

The compressed digital image data based on MPEG., etc., which is outputted from the variable word length coder 60, is inputted to the decoder 4 via a storage/transmission means 70. Specifically, or it is recorded on a storage medium such as an optical disk, magnetic disk or magneto-optic disk and sold or distributed, or transmitted by wireless or wire broadcasting such as a ground wave/satellite/cable, or transmitted by a network such as wireless/wire communication, e.g., ground wave, satellite or cable, ATM, or ISDN, and is then delivered to the decoder 4.

On the side of the decoder 4, the compressed digital image data delivered by the storage/transmission means 70 is inputted to the variable word length decoder 80, converted to fixed length codes and outputted. The data outputted from the variable word length decoder 80 is inputted to the inverse quantizer 90 where it is inverse-quantized, and outputted. The data outputted from the quantizer 90 is inputted to the IDCT unit 100 and electronic water mark detection means 120.

In the inverse discrete cosine transformation unit 100, a two-dimensional reverse discrete cosine transformation is subjected to data in a spatial frequency area of each 8 pixels×8 pixels block. The data is thereby transformed from data expressed in a spatial frequency area to data expressed in a time area, and the reproduced image 110 that is substantially the same as the original image is thus outputted.

A check is also made as to whether the specified electronic mark data (EMD) 30 has been embedded in the data which is supplied to the electronic water mark detection means 120. When it is detected that the specified electronic mark data 30 was embedded, a signal indicating this fact is outputted. This electronic mark data 30 is the same as the electronic mark data 30 on the encoder 3 side.

The signal indicating that the electronic mark data 30 is embedded in the data, which is outputted by the electronic water mark detecting means (DET) 120, is inputted to a display 130, and, according to the signal, a detection state is indicated by sound, light, characters or an image or the like. The result is recorded on a file, and other devices may be controlled according to the signal, as will be described later.

Figure 2:
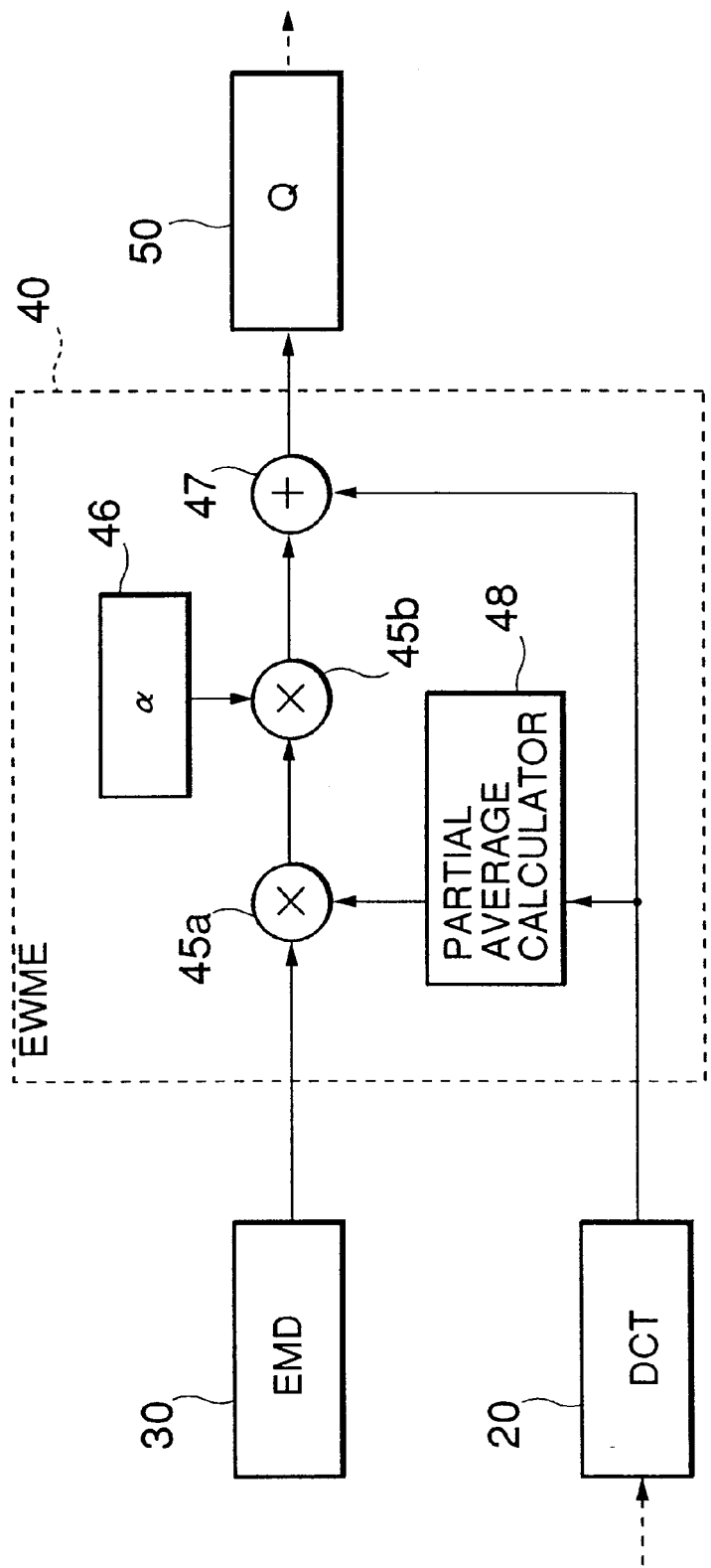
FIG. 2 is a block diagram showing the construction of an electronic mark embedding means 40 according to the first embodiment of this invention.

FIG. 2 is a block diagram showing the construction of the electronic water mark embedding means 40. As shown in FIG. 2, the electronic water mark embedding means 40 comprises a first multiplier 45a, second multiplier 45b, constant (α) register 46, adder 47 and partial average calculator 48.

Figure 3:
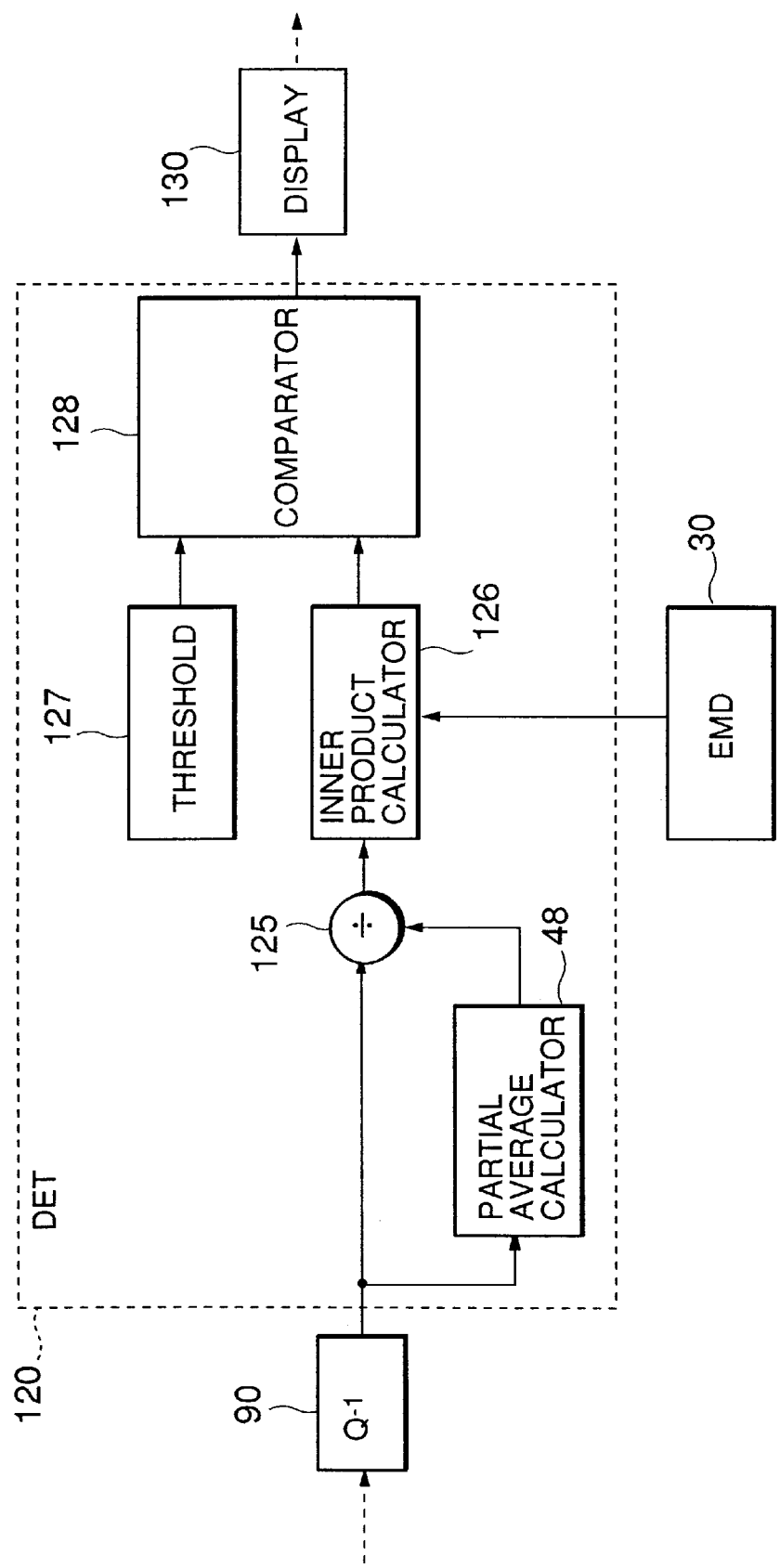
FIG. 3 is a block diagram showing the construction of an electronic mark detection means 120 according to the first embodiment of this invention.

FIG. 3 is a block diagram showing the construction of the electronic water mark detecting means (DET) 120. As shown in FIG. 3, the electronic water mark detecting means 120 comprises a partial average calculator 48, a divider 125, an internal product calculator 126, a threshold register 127 and a comparator 128.

Next, operations of the first embodiment of this invention will be described referring to FIGS. 1–3.

First, on the side of the encoder 3, it will be assumed that the original image 10 is digital data expressed in a time region. This digital data originates from digital data produced by computer graphics (CG), or that produced by scanning a photograph or picture with a scanner or a TV camera.

The original image 10 is inputted to the DCT unit 20, and by subjecting two-dimensional DCT, which is a type of orthogonal transformation, to blocks of 8 pixels×8 pixels size, it is transformed from data expressed in a time area to data expressed in a spatial frequency area.

When it is expressed in a time area, and there is no statistical bias on the occurrence probability of the data, data compression is difficult. However, when the data is transformed by two-dimensional DCT to a form in which it is expressed in a spatial frequency area, a statistical bias on the occurrence probability of the data appears and data compression is easier to perform. Specifically, the data is biased toward the low frequency area.

The data from the DCT unit 20 is inputted to the electronic water mark embedding means 40, and the specific electronic mark data 30 is embedded. Embedding of this electronic mark data 30 is performed in each blocks, as follows.

n data are taken in sequence from the low frequency component of the AC component having higher value in the spatial frequency area outputted from the DCT unit 20. Let this data be f(1), f(2), . . . , f(n).

The electronic mark data 30 w(1), w(2) . . . w(n) is chosen from a normal distribution with an average of 0 and variance of 1. In practice, meanings are first selected and assigned to the electronic mark data. Then:

$$F(i)=f(i)+\alpha*\mathrm{avg}(f(i))*w(i)$$

where, i=1, 2 . . . n and "*" denotes multiplication. is calculated for each i, and the input data f(i) is replaced by F(i) and outputted. This equation means that the data α*avg (f(i))*w(i) is added as a mark to each component f(i) in the original image spectrum. In this context, α is a scaling factor, and avg(f(i)) is a partial average which is the average of the absolute values of m neighboring areas, for example, when m=3, the neiboring areas are f(i−1), f(i) and f(i+1). It should be noted here that (i−1), (i) and (i+1) are not limited to side by side frequencies. This partial average is calculated by the partial average calculator 48. It will be understood that computation of the aforesaid F(i) is performed by the partial average calculator 48, the multipliers 45a, 45b and the adder 47 of FIG. 2.

In the spatial frequency area, data is biased towards lower frequencies. In other words, there is a high power spectrum in the low frequency area, so there is very little effect on the image if a small value is added in the form of an electronic mark to this part, and therefore the mark can hardly be perceived in practice by the human eye. On the other hand, as the part where there is a high power spectrum shows characteristic features of the image, the image would be severely degraded if it were attempted to remove the embedded electronic mark. This means that an electronic mark can be embedded without impairing image quality, but it is almost impossible to remove the mark without degrading image quality. This is a major difference from the case where information indicating copy inhibition is entered in the form of a flag or the like, such as data header.

Moreover, as the mark is embedded in a prominent part of the image in the spatial frequency area, it remains when the image is enlarged or reduced, or part of the image is cut out and recorded on a VTR or printed on paper, and it may be detected for example when the image is re-digitized and detection processing is performed.

The data from the electronic water mark embedding means 40 is inputted to the quantizer 50, where it is quantized. In this context, quantization means that the value of each spatial frequency component is divided by an integer greater than 1. As a result, many high spatial frequency components which had only a small value become 0, and even when they are not 0, the range of possible values becomes narrower so that the amount of data is reduced.

Data outputted by the quantizer 50 is supplied to the variable word length encoder 60, converted from fixed length codes to variable length codes, and outputted as digital data compressed by MPEG or the like.

In variable length coding, the amount of data is reduced by assigning shorter codes the higher the appearance frequency in the data, such as Hufmann codes or algebraic codes.

In MPEG, Hufmann codes are used, however in variable word length coding, the coding-decoding process is reversible, and there is no difference in the action or effect of this invention whichever code is used provided that it is reversible.

Digital image data from the variable word length coder 60 in this way is sent to the decoder 4 by a recording/transmission means 70. Specifically, it is recorded on a storage/recording medium such as a CD-ROM, sold or distributed, or may be broadcast or transmitted by wireless or wire to the decoder 4. This invention is not dependent on these forms of treating the data.

The compressed digital image data reaching the decoder 4 is supplied to the variable word length decoder 80, and is converted from variable length codes to fixed length codes.

Variable length coding is performed in order to reduce the amount of data in the process of storage/transmission, but fixed length codes are easier to process.

The data from the variable word length decoder 80 is inputted to the inverse quantizer 90 where it is inverse-quantized and outputted. Here, the value of each frequency component is returned almost to the original value by multiplying with the integer used for division during quantization in the encoder 3. At this stage, the original image has effectively been reproduced in a form expressed in the spatial frequency area.

The data from the inverse quantizer 90 is inputted to the inverse discrete cosine transformation unit 100 and the electronic water mark detection means (DET) 120.

A two-dimensional inverse discrete cosine transformation is subjected to data of each block in a spatial frequency area, the data inputted to the inverse discrete cosine transformation unit 100 is thereby transformed from data expressed in the spatial frequency area to data expressed in the time area, and is outputted as the reproduced image 110.

To be precise, the embedded electronic mark data 30 is then present in the reproduced image 110 as noise, but this does not present a problem as it cannot be perceived by the human eye, as mentioned hereabove.

The reproduced image 110 may be displayed in various ways, e.g. displayed on a CRT, encoded as a NTSC video signal, recorded as a file on a magnetic disk, or printed on paper by a printer.

The data inputted to the electronic water mark detection means 120 is examined to see whether or not it contains the specific electronic mark data 30, and when this mark is embedded, a signal indicating this fact is outputted.

Detection of the electronic mark data 30 is performed in block-by-block by the following process. n data are sampled from the low frequency components in the AC component of the input block data, i.e. F (1), F (2), . . . , F (n). In the partial average calculator and divider 125, a partial average avg(F (i)) of the absolute values of m neighboring points, for example, F(i−1), F(i), F(i+1) is calculated for all i, i.e.

$$W(i) = F(i)/\mathrm{avg}(F(i))$$

where i=1, 2 . . . n

Next, a summation of each W(i) over an entire image is calculated as WF(i) for each i in the inner product calculator 126.

Next, the internal product calculator 126 calculates a statistical similarity C for w(i) which is the electronic mark data 30 and WF(i) described above using internal product vectors.

$$C = WF \cdot w / (WFD * wD)$$

where WF=(WF(1), WF(2), . . . , WF(*n*))
w=(w(1), w(2), . . . , w(n))
WFD=absolute value of vector WF,
wD=absolute value of vector w, and
. denotes an internal product of vectors.

When the statistical similarity C is equal to or greater than a specified value (threshold value), it is determined that the electronic mark data 30 is embedded. This electronic mark data 30 is the same as the electronic mark data 30 on the encoder 3 side.

A signal output by the electronic water mark detecting means 120, indicating that a specific electronic mark is embedded in the data, is input to a display unit 130. According to this signal, the display unit 130 outputs sound, audio, light or an image, or records on a file, or transmits information, or controls another device depending on the signal, so as to display the fact that the electronic mark data 30 was detected.

Next, a second embodiment of this invention will be described referring to the drawings.

Figure 4:
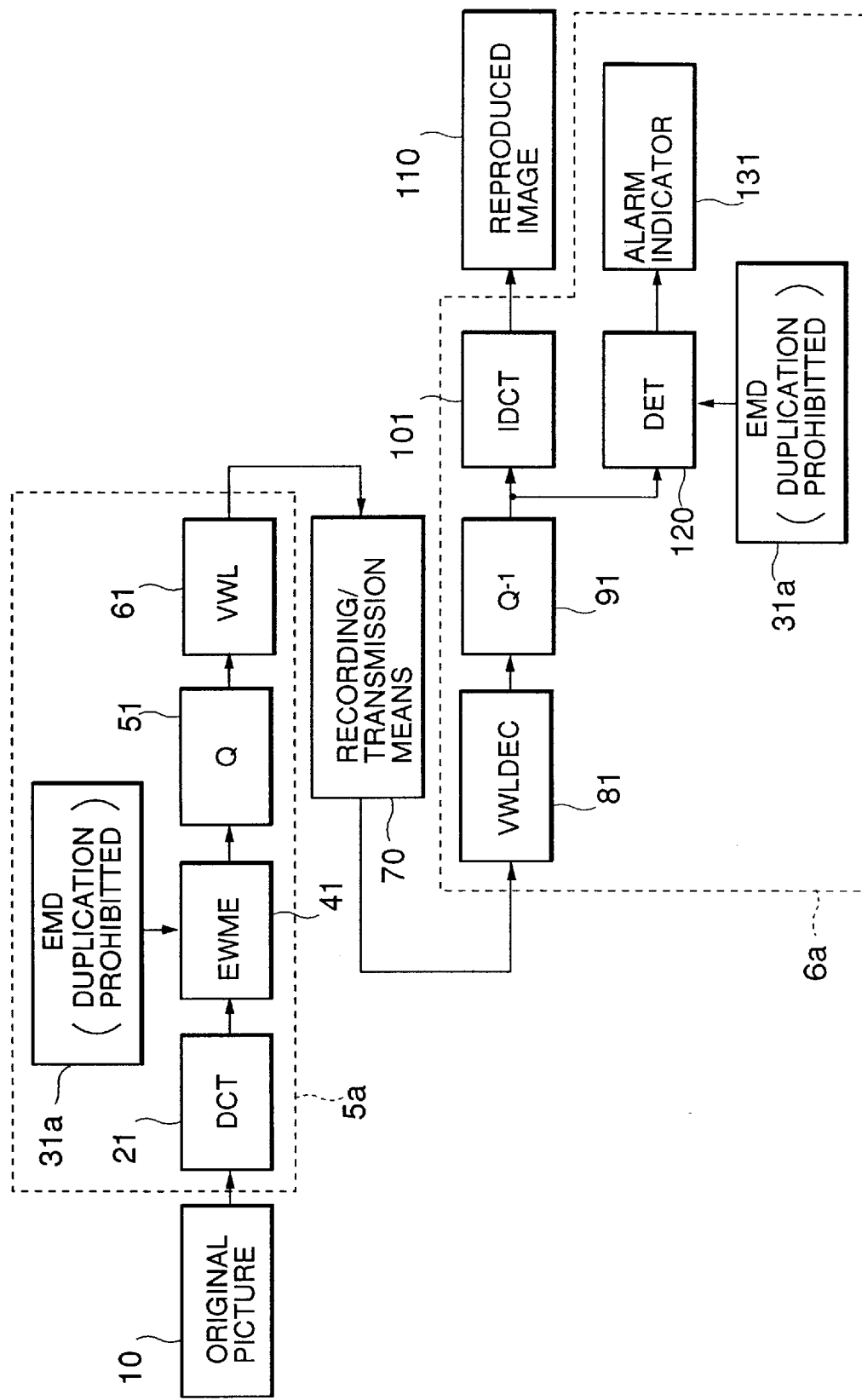
FIG. 4 is a block diagram showing a second embodiment of this invention.

FIG. 4 is a block diagram showing the second embodiment of this invention.

As shown in FIG. 4, an encoder 5*a* comprises a DCT unit 21, electronic mark embedding device 41, electronic mark data 31*a*, quantizer 51 and variable word length coder 61.

A decoder 6*a* comprises a variable word length decoder 81, an inverse quantizer 91, an inverse discrete cosine transformation unit 101, electronic mark detector 121, an alarm display 131 and an electronic mark data 31*a*.

On the side of the encoder 5*a*, the original image 10 is supplied to the DCT unit 21, converted from data expressed in the time area to data expressed in the spatial frequency area by subjecting two-dimensional DCT on a 8×8 size block basis, and is then outputted.

The electronic water mark embedding device 41 embeds electronic mark data 31la, which has previously given the meaning of prohibiting duplication, in the data from the DCT unit 21.

The output of the electronic water mark embedding device 41 is supplied to the quantizer 51 and quantized. The quantized output is supplied to the variable word length encoder 61, encoded as variable length codes from fixed length codes.

The output of the variable word length encoder 61 is output from the encoder 5*a* as compressed digital image data. The compressed digital image data, is passed via the storage/transmission means 70, and reaches the decoder 6*a*. Specifically, it is recorded on a storage medium such as a CD-ROM, an optical disk such as a DVD-ROM, a magnetic disk such as HD or the like, or a magneto-optic disk, after which it may be sold or distributed. Alternatively, it may broadcast or transmitted by wireless or wire such as via satellite, terrestrial radio broadcast, cable broadcasting, ATM circuits or ISDN, and thence reaches the decoder 6*a*.

The compressed digital image data is supplied to the variable word length decoder 81, is decoded from variable length codes to fixed length codes.

The output from the variable length decoder 81 is supplied to the inverse quantizer 91 where it is inverse-quantized. The output of the inverse quantizer 91 is supplied to the inverse discrete cosine transformation unit 101 and electronic water mark detector 121. A two-dimensional inverse discrete cosine transformation is subjected to each block of the data supplied to the inverse discrete cosine transformation unit 101, which is thereby converted from an expression in the spatial frequency area to an expression in the time area, and is outputted as the reproduced image 110. The electronic mark detector 121 detects whether or not the electronic mark data 31*a* is embedded in the input data, and if so, a signal indicating detection is outputted.

According to this embodiment, the significance of prohibiting duplication is previously assigned to the electronic mark data 31*a* in this embodiment, so it is possible to know whether duplication of the digital image data in which the electronic mark data 31*a* was detected, is prohibited by copyright laws.

When a signal output by the electronic water mark detector 121 indicating that the electronic mark data 31*a* was detected, is inputted to the alarm indicator 131, a warning that duplication of the digital image data is prohibited is presented to the user, and unauthorized use is suppressed by appealing to the user's conscience. Specifically, this alarm can take the form of a lamp indicating prohibition of duplication, the lighting of an LED or the like, output of a warning sound, or a character display.

Next, a third embodiment of this invention will be described referring to the drawings.

Figure 5:
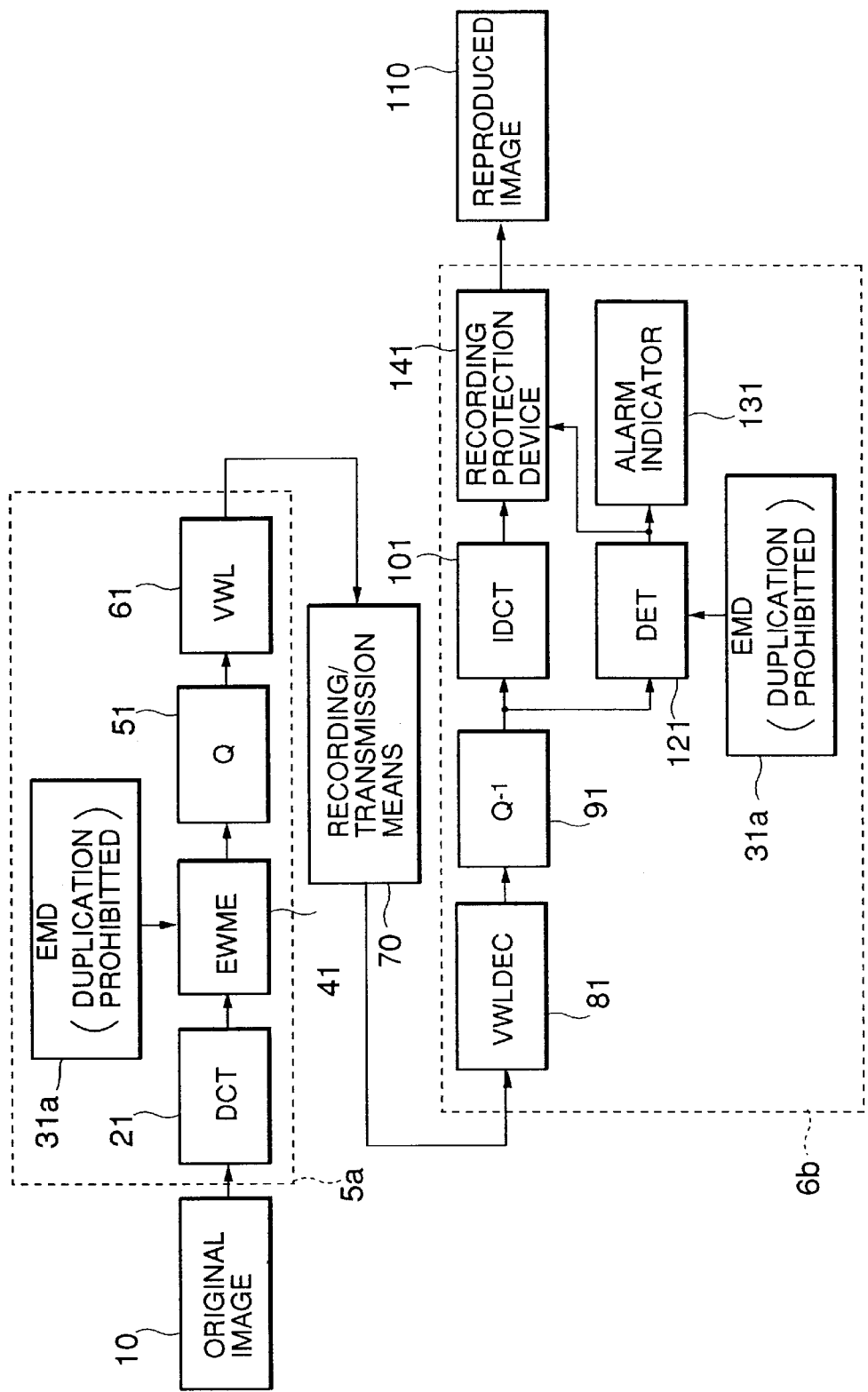
FIG. 5 is a block diagram showing a third embodiment of this invention.

FIG. 5 is a block diagram showing the construction of the third embodiment of this invention.

In FIG. 5, the encoder 5a is identical to the encoder 5a of the second embodiment.

The decoder 6b is different from the second embodiment in that it comprises a recording protection device 141 provided after the reverse discrete cosine transformer 101 in addition to the elements of the decoder 6a of the second embodiment.

Next, the action of the third embodiment will be described. Elements which are identical to those of the second embodiment have the same operation, and their description will not be repeated here.

The output of the inverse discrete cosine transformation unit 101, namely the reproduced image data, is supplied to the recording protection device 141. The output of the electronic mark detector 121 is also supplied to the recording protection device 141 and the alarm indicator 131.

In the recording protection device 141, reproduced image data from by inverse discrete cosine transformation unit 101, is converted to a TV signal such as NTSC, PAL, etc.

However, when a signal indicating that electronic mark data was detected is supplied from the electronic mark detector 121 is inputted, i.e. when duplication is prohibited. The recording protection device outputs a signal to interfere with normal recording on a VTR, etc., in addition to the reproduced image. This signal to interfere with normal recording on a VTR must be such that, for example, it permits normal display on a TV receiver even when added to a TV signal, but prevents normal recording from taking place on a VTR.

Several types of signal may be used for this purpose. Use may be made of the fact that scan sync and color sync feedback control loops comprise mechanical elements in a VTR so that response is slow, whereas these loops comprise only electrical elements in a TV receiver so that response is slow. Frequently, therefore, a non-standard signal is mixed with the reproduced image signal to cause a malfunction of these control loops in the VTR .

The output of the recording protection device 141 is the output of the decoder 6b, and the reproduced image 110 is obtained by displaying this on a TV receiver.

In this embodiment, not only is a warning given to prohibit duplication, but also a playback image is outputted in the form of a TV signal which has been processed so that it cannot be normally recorded on a VTR. It can be expected that this is a more efficient means of preventing duplication than that of the second embodiment.

Next, a fourth embodiment of this invention will be described referring to the drawings.

Figure 6:
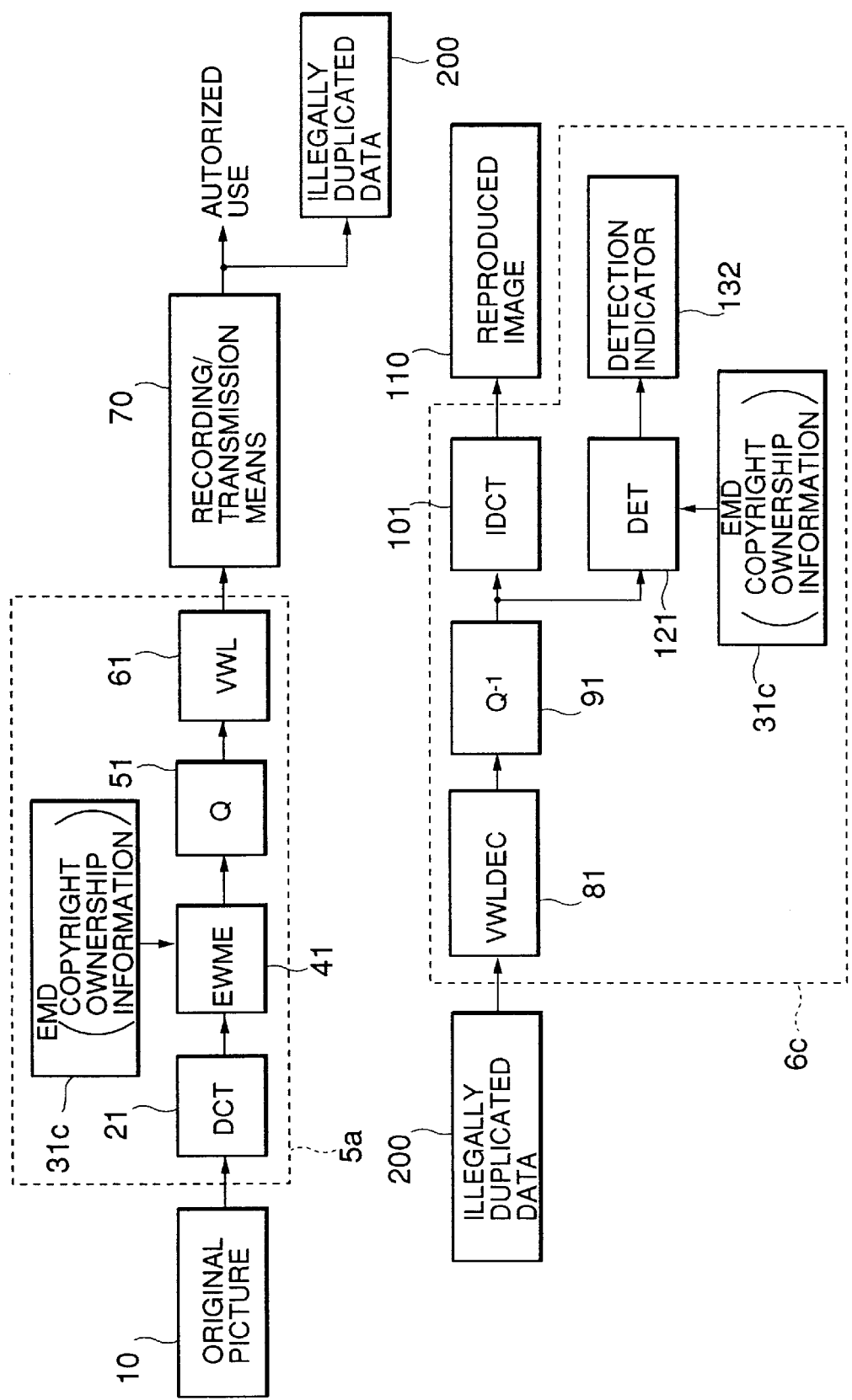
FIG. 6 is a block diagram showing a fourth embodiment of this invention.

FIG. 6 is a block diagram showing the fourth embodiment of this invention.

As shown in FIG. 6, the encoder 5c and decoder 6c are different from the second embodiment in that the electronic mark data 31c has the significance of copyright ownership information, and comprises a detection indicator 132 instead of the alarm indicator 131.

Next, the operation of the fourth embodiment will be described. The construction and operation of parts for which a description is omitted, are identical to those of the second embodiment.

The output of the electronic water mark detection means 121 is input to the detection display device 132.

When a signal is inputted to the electronic water mark detection means 121 showing it has been detected that the electronic mark data 31c was embedded, the detection indicator 132 indicates this fact by, for example, lighting an LED.

In the coder 5c and decoder 6c, if the electronic mark data 31c is stored on a memory card or the like and the card is such that it can be fitted to or removed from the device, the device may be shared by a plurality of users.

In this example, a producer of digital image data uses the encoder 5c to embed a characteristic electronic mark data 31c as a kind of a digital signature during the process of creating the data.

Digital image data produced in this way passes via the storage/transmission means 70 and is distributed, but some of the data may be data which has been illegally duplicated and used without permission.

If some data is discovered which seems to have been illegally duplicated and used without permission, the electronic mark data 31c used as the copyright owner's ID is detected in this data in the decoder 6c. If this data is illegally duplicated data 200, the embedded electronic mark data 31c can be detected, and this may be used as proof so that legal means, such as requiring the user to stop using the data or requesting the user to pay compensation, can may be employed.

Conversely, when some data which seems to be counterfeit is discovered, an attempt may be made in the decoder 6c to detect the electronic mark data 31c which was used as the copyright owner's ID. If the data is counterfeit, the electronic mark data 31c which should have been embedded in the data will not be detected, and legal means can be employed using this as proof.

Next, a fifth embodiment of this invention will be described referring to the drawings.

Figure 7:
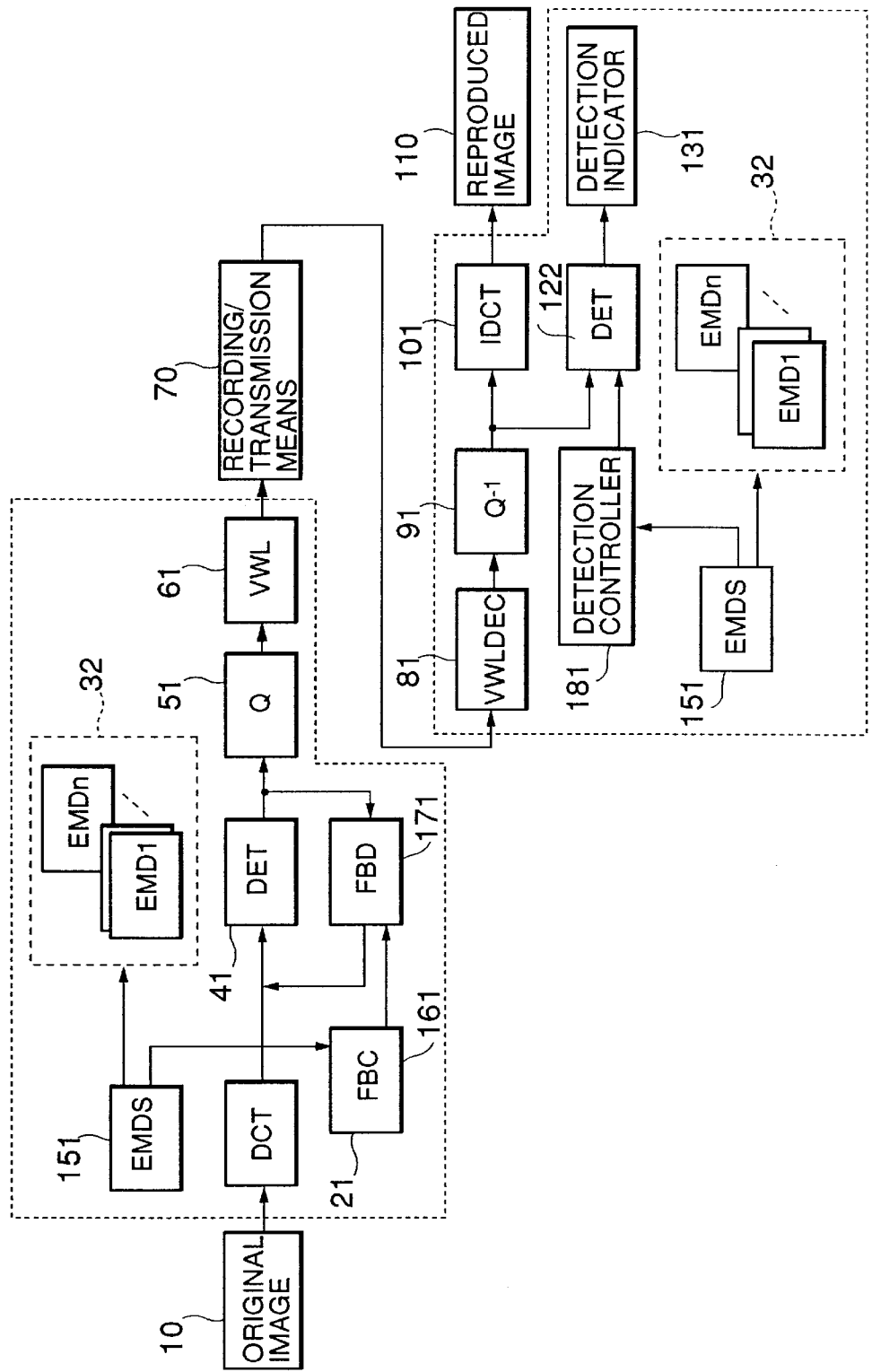
FIG. 7 is a block diagram showing a fifth embodiment of this invention.
Figure 8:
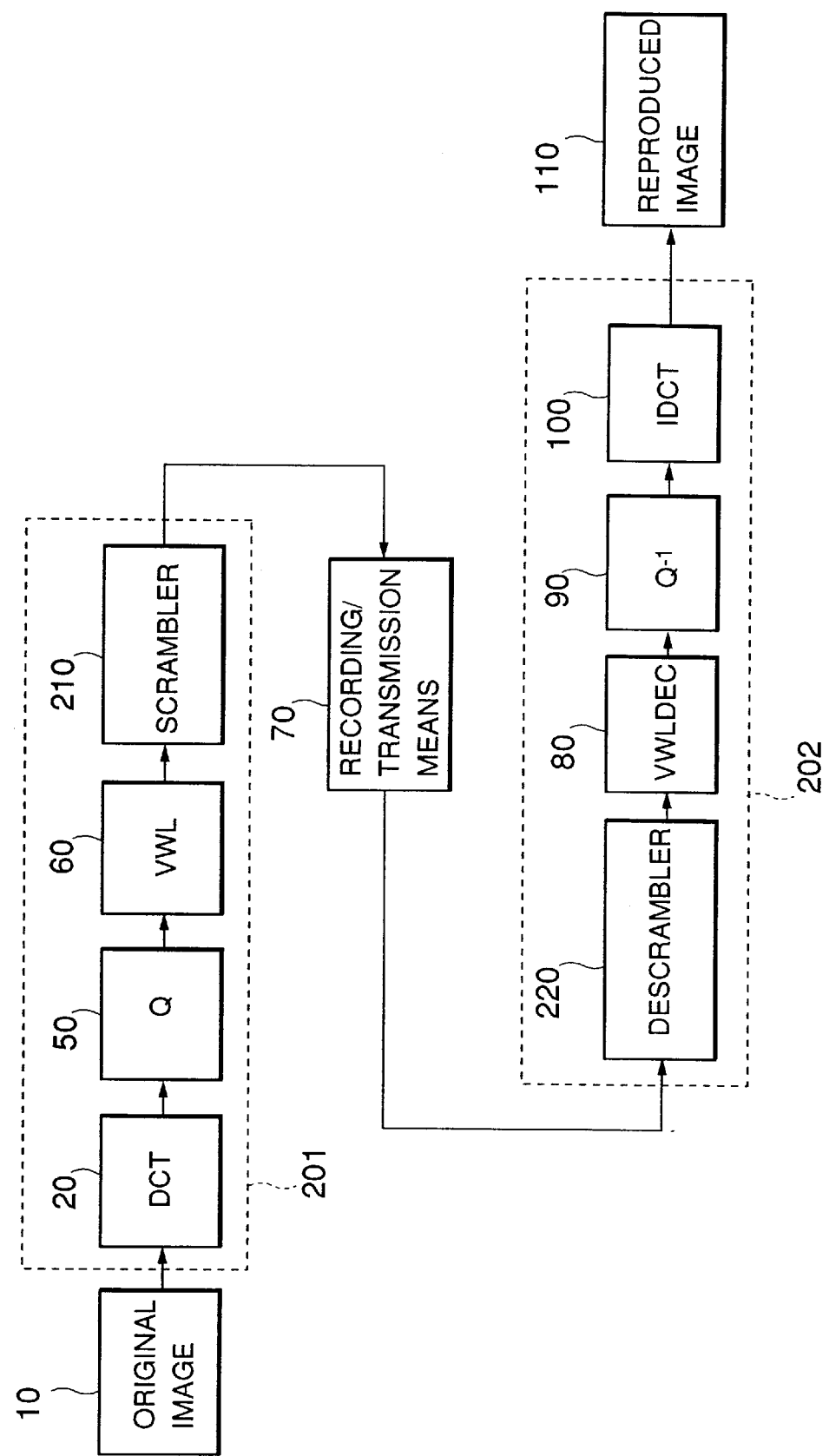
FIG. 8 is a block diagram showing the prior art.

FIG. 7 is a block diagram showing the fifth embodiment of this invention.

As shown in FIG. 7, the encoder 5d and decoder 6d are so constructed that a plurality of electronic mark data can be embedded or detected.

First, the encoder 5d is provided with an electronic water mark data table 32 for storing n electronic mark data from electronic mark data 1 (EMD1) to electronic mark data n (EMDn), instead of the electronic mark data 31a of the encoder 5a of the second embodiment.

In addition to the elements of the encoder 5a, an electronic mark data selection (EMDS) 151, feedback controller (FBC) 161 and feedback device (FBD) 171 are also provided.

Next, the action of the fifth embodiment will be described. The construction and operation of parts for which descriptions are omitted are identical to those of the second embodiment.

To embed a plurality of electronic mark data, processing is performed to embed electronic mark data in data which already contains electronic mark data.

The electronic mark data selector 151 selects j electronic mark data ($0 \leq j \leq n$) from n electronic mark data, i.e. from electronic mark data 1 to electronic mark data n, which are stored in the electronic mark data table 32, and controls the electronic mark data table 32 so as to output the selected data in sequence to the electronic water mark embedding means 41.

A number (j) of embedded electronic mark data, i.e. an embedding processing repetition frequency j, is outputted to the feedback controller 161.

The feedback unit 171 is controlled so that the output of the electronic mark embedding device 41 is fed back j−1 times to its input. The feedback unit 171 feeds back the output of the electronic mark embedding device 41 to the input according to the output of the feedback controller 161.

Next, the decoder 6d is provided with an electronic mark data table for storing n electronic mark data from electronic mark data 1 to electronic mark data n instead of the electronic mark data 31a of the decoder 5a of the second embodiment.

In addition to the elements of the decoder 6a, the electronic mark data selector 151 and a detection controller 181 are also provided.

To detect a plurality of electronic mark data, detection processing is performed on all the electronic mark data which it is desired to detect.

The electronic mark data selector 151 selects electronic mark data k ($0 \leq k \leq n$) from n electronic mark data, i.e. from electronic mark data 1 to electronic mark data n, which are stored in the electronic mark data table 32, and controls the electronic mark data table 32 so as to output the selected data in sequence to the electronic mark embedding detector 121.

To enable this repeat processing, the electronic mark detector of this embodiment outputs the k, a number of electronic mark data to be detected, i.e. a detection repeat frequency k, to the detection controller 181. The detection controller 181, controls the electronic mark detector 121 so as to repeat detection k times.

According to this embodiment, more information can be embedded and detected than in the first to fourth embodiments, so if two electronic mark data, i.e. information intended to prohibit duplication and information regarding owner's copyright, are embedded. Therefore, the combined effect of the first and second embodiments may be obtained in this embodiment. Moreover, if other information is also embedded, a correspondingly greater effect may be expected.

In the aforesaid embodiment, the case was described where DCT was used as a means to convert an image signal into data in a spatial frequency area, but it will be obvious to those conversant with the art that other orthogonal transformation methods may be used, e.g. Hadamard transformation, Fourier transformation, K–L transformation and so on.

It will be understood by those skilled in the art that the encoder and decoder of the image processor of this invention may comprise a microprocessor and a recording medium for storing a program such as a ROM or floppy disk, and that the aforesaid forms of the invention described hereabove may be implemented by storing a program to faithfully perform these operations on this medium. These modifications also comprise a part of this invention. The encoder of this invention can embed electronic mark data (identifying data) in the image without impairing the image quality. This is because, as the embedded electronic mark data is present as low level noise in spatial frequency component having higher values, it is hardly perceptible to the human eye.

Also, embedding of the electronic mark data is performed by adding an electronic mark data pattern to spatial frequency components having a high value when image is expressed in a spatial frequency area. The electronic mark data is chosen from a normal distribution having an average of 0 and a dispersion of 1, and this is added after scaling in direct proportion to the value of the frequency components. The effect on the image is therefore small.

It is almost impossible for a third party to eliminate or modify the electronic mark data embedded in the image by the encoder of this invention. This is because as the electronic mark data is embedded in frequency components having a high value when the target image is expressed in a spatial frequency area, it is not removed by processing such as filtering, duplication, recording on a VTR or printing on paper. Further, even if a third party embeds a different electronic mark data, the original mark remains and is detected by the decoder. If the image is processed so that the electronic mark data can no longer be detected, information in characteristic parts of the image is destroyed, so the image considerably deteriorates. The value of the image is then lost, so there is no meaning in removing the electronic mark data.

According to this invention, by first embedding a unique electronic mark data relating to himself in the image using the encoder of this invention, a producer or publisher of digital image data can easily verify the situation when there is a possibility that illegal duplication has occurred.

Specifically, detection is performed on this data in the decoder, and if the unique electronic mark data is detected, it proves that he is the rightful owner of the data. This is because the electronic mark data cannot be removed or modified, remains indefinitely, and image quality severely deteriorates if an attempt is made to remove it.

According to this invention, when a producer or publisher of digital image data previously embeds, in the encoder, electronic mark data containing information to prohibit duplication of an image, this is detected in the decoder and the user is warned that duplication is prohibited. Alternatively, illegal duplication is prevented and the owner's copyright is protected by processing the image so that it cannot be correctly copied on a VTR. This is because the electronic mark data cannot be removed or modified, remains indefinitely, and image quality severely deteriorates if an attempt is made to remove it.

This invention is suited to operate in combination with the coding systems JPEG, MPEG-1, MPEG-2, H261 and H263, and may be implemented by a relatively simple addition to these systems. This is due to the fact that the basic algorithm of JPEG, MPEG-1, MPEG-2, H261 and H263 converts from an original image expressed in a real space area to data expressed in a spatial frequency area on the encoder side, performs data compression, stores or transmits the data, following which the data is decompressed and converted from data expressed in a spatial frequency area to data expressed in a read space area on the decoding side so as to obtain the reproduced imate. There is thus no need for a large amount of computation such as DCT transformation or reverse DCT transformation for the sole purpose of embedding and detecting the electronic mark data. As this processing is common with the basic function of JPEG and MPEG, it can be implemented by only a small increase in the amount of computation.

What is claimed:

1. An image data processor which supplies data obtained by:

applying an orthogonal conversion to an original image so as to convert it to a spatial frequency area data set, modifying said spatial frequency data by adding n second spatial frequency data calculated from one set of n predetermined identifying data w(1), w(2), . . . w(n) and n spatial frequency data f(1), f(2), . . . f(n) selected from said spatial frequency area data set respectively to said spatial frequency data f(1), f(2), . . . f(n), and compression encoding this modified spatial frequency area data set, said processor comprising:

expansion means for expanding said compressed data set, detecting mean for outputting a detection signal when said identifying data is detected from restored values F(i), (i=1, 2, ... n) of said modified n spatial frequency data f(1), f(2), ... f(n) obtained from said data set expanded in said expander said detecting means computing a degree of similarity between, firstly, n values F(i)/avg (F(i))(i=1, 2, ... n), obtained by dividing said restored values by partial averages calculated by partial average calculating means for calculating partial averages avg (F(i))(i=1, 2, ... n) of said restored values F(i)(i=1, 2, ... n), and secondly, said identifying data w(i)(i=1, 2, ... n), and outputs said detection signal when this degree of similarity exceeds a predetermined value, means for applying an inverse orthogonal transformation to said restored spatial frequency area data set so as to restore said original data, and means for mixing a signal for causing incorrect operation of an image recording device on which said restored original image is to be recorded when said detecting means outputs said detection signal, and supplying said restored original image to said image recording device when said detection signal is absent.

2. An image processor comprising an encoder and a decoder, wherein said encoder comprises:

conversion means for applying an orthogonal transformation to an original image so as to convert it to a spatial frequency area data set, a data embedding circuit for modifying said spatial frequency data by adding n second spatial frequency data calculated from one set of n predetermined identifying data w(1), w(2), ... w(n) and n spatial frequency data f(1), f(2), ... f(n) selected from said spatial frequency area data set respectively to said spatial frequency data f(1), f(2), ... f(n), and embedding said identifying data in said spatial frequency area data set, and a compression circuit for compressing this modified spatial frequency area data set in which said identifying data is embedded, wherein said decoder comprises:

an expansion circuit for expanding said compressed spatial frequency area data set, and restoring said spatial frequency area data set, and a detector for outputting a detection signal when said identifying data is detected from restored values F(i), (i=1, 2, ... n) of n spatial frequency data f(1), f(2), ... f(n) to which said second spatial frequency data was added in said encoder;

wherein said data embedding circuit modifies said spatial frequency data by multiplying said n identifying data w(1), w(2), ... w(n), to partial averages avg (f(i)(i=1,2, ..., n) of n spatial frequency data f(1), f(2), ... f(n) and a constant α respectively together, adding the spatial frequency area data f(i) to the product α*w(i)*avg f(i)(i=1, 2, ... n), and said detecting means a degree of similarity between, firstly, n values F(i)/avg (F(I))(i=1, 2, ... n) obtained by dividing said restored values by partial averages calculated by partial average calculator for calculating partial averages avg (F(i))(i=1, 2, ... n) of said restored values F(i) (i=1, 2, ... n), and secondly, said identifying data w(i)(i=1, 2, ... n), and outputs said detection signal when this degree of similarity exceeds a predetermined value, and wherein said image processor further comprises:

means for applying a orthogonal transformation to said restored spatial frequency area data set so as to restore said original data, and means for mixing a signal for causing incorrect operation of an image recording device on which said restored original image is to be recorded when said detecting means outputs said detection signal, and supplying said restored original image to said image recording device when said detection signal is not output.

3. An image processor comprising an encoder and a decoder, wherein said encoder comprises:

conversion means for applying an orthogonal transformation to an original image so as to convert it to a spatial frequency area data set, a data embedding circuit for modifying said spatial frequency data by adding n second spatial frequency data calculated from one set of n predetermined identifying data w(1), w(2), ... w(n) and n spatial frequency data f(1), f(2), ... f(n) selected from said spatial frequency area data set respectively to said spatial frequency data f(1), f(2), ... f(n), and embedding said identifying data in said spatial frequency area data set, and a compression circuit for compressing this modified spatial frequency area data set in which said identifying data is embedded, wherein said decoder comprises:

an expansion circuit for expanding said compressed spatial frequency area data set, and restoring said spatial frequency area data set, and a detector for outputting a detection signal when said identifying data is detected from restored values F(i), (i=1, 2, ... n) of n spatial frequency data f(1), f(2), ... f(n) to which said second spatial frequency data was added in said encoder;

wherein said data embedding circuit modifies said spatial frequency data by multiplying said n identifying data w(1), w(2), ... w(n), to partial averages avg (f(i)(i=1, 2, ..., n) of n spatial frequency data f(1), f(2), ... f(n) and a constant α respectively together, adding the spatial frequency area data f(i) to the product α*w(i) *avg f(i)(i=1, 2, ... n), and said detecting means a degree of similarity between, firstly, n values F(i)/avg (F(I))(i=1, 2, ... n) obtained by dividing said restored values by partial averages calculated by partial average calculator for calculating partial averages avg (F(i))(i= 1, 2, ... n) of said restored values F(i)(i=1, 2, ... n), and secondly, said identifying data w(i)(i=1, 2, ... n), and outputs said detection signal when this degree of similarity exceeds a predetermined value, wherein said encoder further comprises:

a first table for storing a plurality of identifying data sets, and an encoder control circuit which reads specified sets m (0<m≦M) of data sequentially from said first table, and feeds back the output of said embedding means to the input side of said embedding means each time the first table is read on the (m−1)th occasion from the second occasion, and said decoder further comprises:

a second table for storing identical identifying data to said first table, and a decoder control circuit for sequentially reading said second table from said specified identifying data and supplying it to said detecting means.

4. An image data processor as defined in claim 3, wherein at least one of said first or second tables can be freely attached to and detached from said image data processor.

5. An image data processor which supplies data obtained by:

applying an orthogonal conversion to an original image so as to convert it to a spatial frequency area data set, modifying said spatial frequency data by adding n second spatial frequency data calculated from one set of n predetermined identifying data w(1), w(2), ... w(n) and n spatial frequency data f(1), f(2), ... f(n) selected from said spatial frequency area data set respectively to said spatial frequency data f(1), f(2), ... f(n), and compression encoding this modified spatial frequency area data set, said processor comprising;

a expansion circuit for expanding said compressed data set, and a detector for outputting a detection signal when said identifying data is detected from restored values F(i), (i=1, 2, ... n) of said modified n spatial frequency data f(1), f(2), ... f(n) obtained from said data set expanded in said expander said detector computing a degree of similarity between, firstly, n values F(i)/avg (F(i))(i=1, 2, ... n), obtained by dividing said restored values by partial averages calculated by partial average calculator for calculating partial averages avg (F(i))(i=1, 2, ... n) of said restored values F(i)(i=1, 2, ... n), and secondly, said identifying data w(i)(i=1, 2, ... n), and outputs said detection signal when this degree of similarity exceeds a predetermined value, said processor further comprising:

a converter for applying an inverse orthogonal transformation to said restored spatial frequency area data set so as to restore said original data, and a mixer for mixing a signal for causing incorrect operation of an image recording device on which said restored original image is to be recorded when said detector outputs said detection signal, and supplying said restored original image to said image recording device when said detection signal is absent.

6. An image data processor comprising an encoder and a decoder, wherein said encoder comprises:

a converter for applying an orthogonal transformation to an original image so as to convert it to a spatial frequency area data set, a data embedding circuit for modifying said spatial frequency data by adding n second spatial frequency data calculated from one set of n predetermined identifying data w(1), w(2), ... w(n) and n spatial frequency data f(1), f(2), ... f(n) selected from said spatial frequency area data set respectively to said spatial frequency data f(1), f(2), ... f(n), and embedding said identifying data in said spatial frequency area data set, and a compression circuit for compressing this modified spatial frequency area data set in which said identifying data is embedded, and wherein said decoder comprises:

an expansion circuit for expanding said compressed spatial frequency area data set, and restoring said spatial frequency area data set, and a detector for outputting a detection signal when said identifying data is detected from restored values F(i), (i=1, 2, ... n) of n spatial frequency data f(1), f(2), ... f(n) to which said second spatial frequency data was added in said encoder, wherein:

said data embedding circuit modifies said spatial frequency data by multiplying said n identifying data w(1), w(2), ... w(n), n spatial frequency data f(1), f(2), ... f(n) and a constant α respectively together, adding the spatial frequency area data f(i) to the product α*w(i)*f(i)(i=1, 2, ... n), and said detector computes a degree of similarity between, firstly, n values F(i)/avg (F(i))(i=1, 2, ... n) obtained by dividing said restored values by partial averages calculated by partial average calculator for calculating partial averages avg (F(i))(i=1, 2, ... n) of said restored values F(i)(i=1, 2, ... n), and secondly, said identifying data w(i)(i=1, 2, ... n), and outputs said detection signal when this degree of similarity exceeds a predetermined value, said processor further comprising:

a converter for applying a orthogonal transformation to said restored spatial frequency area data set so as to restore said original data, and a mixer for mixing a signal for causing incorrect operation of an image recording device on which said restored original image is to be recorded when said detector outputs said detection signal, and supplying said restored original image to said image recording device when said detection signal is not output.

7. An image data processor comprising an encoder and a decoder, wherein said encoder comprises:

a converter for applying an orthogonal transformation to an original image so as to convert it to a spatial frequency area data set, a data embedding circuit for modifying said spatial frequency data by adding n second spatial frequency data calculated from one set of n predetermined identifying data w(1), w(2), ... w(n) and n spatial frequency data f(1), f(2), ... f(n) selected from said spatial frequency area data set respectively to said spatial frequency data f(1), f(2), ... f(n), and embedding said identifying data in said spatial frequency area data set, and a compression circuit for compressing this modified spatial frequency area data set in which said identifying data is embedded, and wherein said decoder comprises:

an expansion circuit for expanding said compressed spatial frequency area data set, and restoring said spatial frequency area data set, and a detector for outputting a detection signal when said identifying data is detected from restored values F(i), (i=1, 2, ... n) of n spatial frequency data f(1), f(2), ... f(n) to which said second spatial frequency data was added in said encoder wherein:

said data embedding circuit modifies said spatial frequency data by multiplying said n identifying data w(1), w(2), ... w(n), n spatial frequency data f(1), f(2), ... f(n) and a constant α respectively together, adding the spatial frequency area data f(i) to the product α*w(i)*f(i)(i=1, 2, ... n), and said detector computes a degree of similarity between, firstly, n values F(i)/avg (F(i))(i=1, 2, ... n) obtained by dividing said restored values by partial averages calculated by partial average calculator for calculating partial averages avg (F(i))(i=1, 2, ... n) of said restored values F(i)(i=1, 2, ... n), and secondly, said identifying data w(i)(i=1, 2, ... n), and outputs said detection signal when this degree of similarity exceeds a predetermined value, wherein said encoder further comprises:

a first table for storing a plurality (M) of identifying data sets, and an encoder control circuit which reads specified sets m ($0<m\leq M$) of data sequentially from said first table, and feeds back the output of said embedding circuit to the input side of said embedding circuit each time the first table is read on the (m−1)th occasion from the second occasion, and said decoder further comprises:

a second table for storing identical identifying data to said first table, and a decoder control circuit for sequentially reading said second table from said specified identifying data and supplying it to said detector.

8. An image data processor as defined in claim 7, wherein at least one of said first or second tables can be freely attached to and detached from said image data processor.

* * * * *